Jan. 30, 1968 O. KNEISEL ET AL 3,366,742

TIME MULTIPLEX TELEPHONE SYSTEM

Filed Aug. 17, 1964

United States Patent Office 3,366,742

Patented Jan. 30, 1968

3,366,742

TIME MULTIPLEX TELEPHONE SYSTEM

Otto Kneisel, Gauting, and Horst Honold, Munich, Germany, assignors to Siemens Aktiengesellschaft, Munich, Germany, a corporation of Germany Filed Aug. 17, 1964, Ser. No. 390,027
Claims priority, application Germany, Aug. 20, 1963, S 86,810
4 Claims. (Cl. 179—18)

ABSTRACT OF THE DISCLOSURE

This application concerns a time multiplex telephone system in which the calling and called connection stations are connected together in an assigned pulse phase by actuation of speaking switches connected between the stations and the multiplex path. Reconfirmation calls (while the existing connection is held), are provided for as are substitution of the part called in a reconfirmation call for the party initiating that call, in the original connection. To provide for access to exchange office lines, etc., as well as for station subscribers, separate circulating storage devices are provided for calling and called stations, and for exchange office lines, etc. These storage devices circulate addresses of the calling and called stations, exchange office lines, etc., in the pulse phase assigned to the call, and control actuation of the speaking switches corresponding to the circulating identifications. However, in order that the reconfirmation and substitution calls may be provided for, with the necessary exclusion from the additional call of one party to the original connection, actuation of the speaking switches is completed by pulses circulating in the same phase in separate control storage devices. Consequently, if a connection is to be retained or held, while one of the stations is to be excluded from it, this result can be effected by cancelling the pulse of the assigned phase in the control storage device associated with that station.

Figure 1:
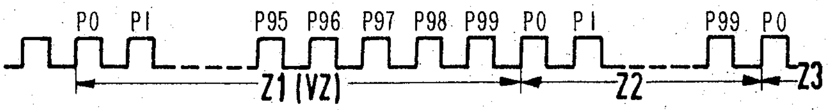

The invention concerns a circuit layout for a telephone exchange system working according to the time multiplex principle, and in particular a secondary station exchange system wherein the control of the connections occurs through time spaced pulses assigned to the connection paths. Further, a calling speaking station participating in a connection, through a corresponding speaking switch, is connected to the speaking multiplex point or path by means of a first circulation storage device and a corresponding decoder, and the called speaking station participating in this connection is connected with the speaking multiplex point through its corresponding speaking switch by means of a second circulation storage device and a corresponding decoder. In each case the connection is in a pulse phase assigned to the connection path.

In the known telephone exchange systems operating in accordance with the time multiplex principle, the pulse phases are either individually assigned to the speaking stations, or the phases are assigned to the connections themselves. In the latter arrangement, a connection between a calling station and a called station is made by means of the switch operated by the pulse phase assigned to the connection, through a multiplex speaking path or common connection. A speaking switch is assigned to each connection station participating in a connection, this switch being operable to connect the station to the multiplex point. The operation of the switch with the pulse phase assigned to the connection path is caused to occur by operation of a circulation storage device for the calling and the called stations, through a decoder.

The object of the present invention is to permit speaking stations participating in a completed connection to communicate with a third speaking station not participating in this connection, in exchange systems operating in accordance with the time multiplex principle. This object further involves the connection of the original station to the third speaking station by means of a pulse phase assigned to the original connection, under the control of a special signal emitted by the speaking station desiring to be connected with the third station, and represents an improvement over the invention described in our co-pending application, Ser. No. 390,026, filed Aug. 17, 1964.

The objects of the invention are achieved by transmittal of control signals to a central control apparatus and evaluation therein, such control signals including those identifying an existing connection between two speaking stations, or between a speaking station and an exchange office line, as well as a signal representing the activation of the special signal requiring connection to a third station. After such evaluation, the central control apparatus emits command signals with the same pulse phase, and these command signals operate the switch of a further storage device which at the time is not storing identifications of the speaking stations or exchange office line participating in the existing connection. These operated switches then connect the signal generator with the storage device last referred to for transmission of the identification of the third connection station, with the pulse phase assigned to the original connection, so that the third station may be controlled and connected thereby.

In this fashion it is possible to produce, for example, reconfirmation connections, in a time multiplex exchange arrangement, with a pulse phase assigned to a pre-existing connection, and to perform this function in simple fashion. In accordance with a further aspect of the invention, the connection station participating in the pre-existing connection, but which is not to participate in the new connection, is prevented from access to the speaking multiplex point by the cancellation of a pulse which has been circulating with the pulse phase of the existing connection in a control circulation storage device. This latter storage device is the one through which the switch for the control of the speaking switch of the station to be excluded is operated. That speaking switch of course is the one which would normally connect the station to the multiplex point each time the assigned pulse phase recurred.

In the drawings an embodiment of the invention is shown, with only sufficient details for an understanding of the invention.

The embodiment shown in the drawings is a system wherein signal transmission occurs over multiplex lines in accordance with the time multiplex principle. That is, the control as well as the coupling together of the speaking conductors occurs in accordance with this time multiplex principle. However, the coupling together of the speaking lines could also occur in a space-separated contact multiple, through use of the same control. Further, the central control apparatus could be considerably different than that shown.

In the embodiment shown, the method of operation of the central control apparatus is described in some detail, but the elements thereof are not described since they are not essential to operation of the invention. That is, any particular set of elements is not required, all that is necessary being appropriate apparatus of well known design operative to perform the functions which will be described hereinafter.

The control processes performed by the control apparatus occur in each case by the alignment of the corresponding addresses of the stations at the output of the signal generator in such a manner that, for example, the switching processes required for reconfirmation occur, with the corresponding pulse phase, in different stages. That is, the processes could occur periodically, in each case after a set time such as 100 milliseconds, by the alignment of the same address at the output of the signal generator in an operation cycle immediately following an information cycle. On the other hand, the central control apparatus could carry out the switching processes, for example those necessary for reconfirmation, in stages such that those necessary to accomplish a change of condition would immediately follow each other. That is, if reconfirmation were to occur, the sequence of the switching processes could be independent from the control by the signal generator and be only dependent on the phase cycle.

Figure 2:
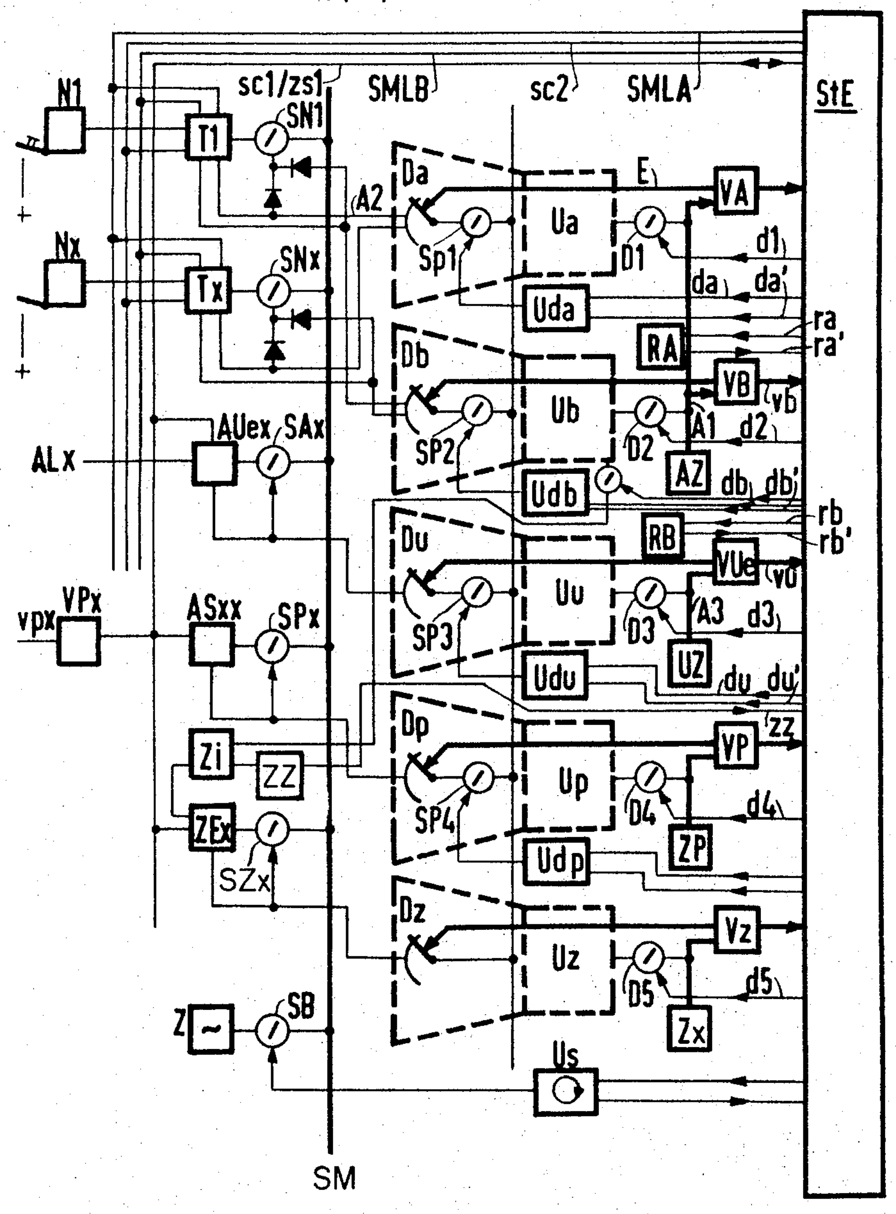

FIG. 1 of the drawings shows a schematic time diagram of the cycles of the apparatus, together with the control pulses or phases provided therefor;

FIG. 2 shows an operative embodiment of a telephone installation designed to operate in accordance with the time multiplex principle, the telephone installation being in particular a secondary telephone installation.

The relationship between the cycles of operation of the apparatus and the pulse phases within such cycles is shown in FIG. 1. The signal generator or counting apparatus AZ in FIG. 2 defines the cycles of the apparatus, while the pulse generator (not shown but described in our copending application, Ser. No. 390,026, filed Aug. 17, 1964) defines the pulse phase sequence within each cycle.

The signal generator AZ may be, for example, a ring counter which at every successive count provides a different coded identification, such as a connection number, to its output line A1. The number of the different identifications stored in a signal generator will determine in each case the length of the cycle of that signal generator. With 1,000 identifications and 100 pulse phases for each identification, the identification cycle would last 100,000 times the length of each pulse phase. If the pulse phase length were one microsecond, the identification cycle would last at least 100 milliseconds. In addition, if operation cycles as well as information cycles are provided for in the system, the identification cycle would be prolonged. On the other hand, if less identifications are picked up from the signal generator, an identification cycle would be correspondingly shorter. Signal generators can be provided for exchange office lines, calling sets and digit receivers, as will be apparent hereinafter. For instance, in addition to the signal generator AZ of FIG. 2, there are provided generators UZ, ZP and ZX which control exchange office lines and digit receivers.

The apparatus of FIG. 2 provides for an identification being circulated in a circulation storage device such as that shown at U*a*. This storage device may include, for example, a magnetostrictive wire which is operated in a 100 microsecond cycle such that a pulse is available at the output E each 100 microseconds following the storage of such a pulse therein. Accordingly, any pulse phase stored in the circulation storage apparatus U*a*, for example, will be repeated every 100 microseconds at the output E. (Such a storage device is more fully described in our said application, Ser. No. 390,026.) This identification may then be compared with the identification then available at the output of the signal generator AZ, and in such fashion it can be ascertained as to whether the identification then being given by the signal generator is at that time registered in the respective circulation storage device. Such a function may be for example performed by the comparison apparatus VA of FIG. 2.

In the time multiplex system described as the operating embodiment, a certain pulse phase is assigned to each speaking station which seeks to make a connection to another station. This can be called a "call phase" and will be assigned upon the lifting of the receiver at the calling station. During the entire period of set-up of the connection and the duration of the call with the called speaking station, the same pulse phase would remain assigned to the speaking station.

It has been assumed above that 100 pulse phases are provided for. This being true, each pulse phase would recur every 100 microseconds, and the identification of a particular station would therefore reappear with that frequency.

In FIG. 1 the time diagram indicates the 100 pulse phases of a phase cycle Z1. These cycles are identified for instance as P0 to P99. Pulse phases P1 to P94 may be assigned as call phases and be assigned to the connections during the entire time of the development of such connections, as well as the time occupied by the call between the two stations. Pulse phases P95 to P0 may be the control phases. It will be evident that a pulse phase such as P1 assigned to a connection will reappear after each cycle. That is, P1 occurs in cycle Z1, is repeated in cycle Z2 100 microseconds later, and is again repeated in cycle Z3, after an additional 100 microseconds. During each cycle, when the pulse phase P1 occurs, all identifications of speaking stations participating in the connection or connection path assigned to this pulse phase, will be in effect collected together, identified, and evaluated in central control apparatus S*t*E. That is, such operation will occur if at the same time the connection number of one of the speaking stations participating in such a connection is simultaneously provided at the output A1 of signal generator AZ. For example, if it is found for a connection number then available at the output of the signal generator AZ, in a pulse phase such as P16, that the connection station in question is either participating in forming a connection, or is engaged in a call, then a corresponding identification is stored. If among the various identifications stored at the particular time, there is a new identification provided, such identification not being present during the previous cycle, an evaluation of the identifications present is again necessary. This evaluation can occur in an operation cycle following the information cycle, if the evaluation of the identifications in each case occurs in dependence upon the conditions and the connection numbers switched on at the output of the corresponding signal generator. However, evaluation can also occur independently of the cycle of the signal generator in the operation cycle and only dependent upon the phase cycle. If dependence on the signal generator is assumed, then the switching to the next connection number is effected only after completion of an operation cycle following an information cycle. However, when no operation cycle is required, the signal generator is immediately switched to the next identification or connection number after the 100 microsecond cycle is completed, so that a new information cycle begins.

If the control apparatus is constructed in such fashion that switching processes take place in successive operation cycles, then the cycle of the signal generator is without significance and the phase cycle is the only one determining the commission of commands. That is, only the phase cycle by emission of commands causes the pickup of new identifications and the resultant development of new control processes, giving rise to emission of such commands.

With the aid of FIG. 2 the functional relationships of a telephone installation working according to the invention in a time multiplex system will now be described. FIG. 2 shows a secondary telephone installation with speaking stations N1 to N*x*, and with exchange office lines AL*x*. The speaking stations N1 to N*x* can be connected with the speaking multiplex path or bus SM by way of speaking switches SN1 to SN*x*, these switches being controlled for this purpose. Also, the exchange office transmission device or repeater AU*ex* can be connected to the same bus by speaking switch SA*x*. The speaking switches SN1 to SN*x* are controlled by pulses which are supplied through the assistance of circulation storage devices U*a* or U*b*. On the other hand, speaking switch SA*x* (and other like switches not shown) may be controlled by pulses supplied through the influence of circulation storage device U*u*.

In addition to the telephone stations of the secondary installation, and the exchange lines, exchange locations such as VP*x* can be connected to the speaking multiplex point or bus SM through speaking switch SP*x*, by way of the transmission device AS*xx*. This connection is achieved through operation of the speaking switch SP*x* by a circulation storage device U*p*. Further, a digit receiver ZE*x* is provided for connection to the same speaking point SM through operation of a connection switch SZ*x*. Finally, a signal transmitter Z (such as a busy signal generator) may be connected to the multiplex point SM by a switch SB.

The system of FIG. 2 is designed so that a speaking station, or an exchange office line, or an exchange location is connected to the multiplex point SM every 100 microseconds upon appearance of the pulse phase assigned to this line or location. Normally there are stored in circulation storage device U*a*, for example, the connection numbers of call*ing* speaking stations, and in circulation storage device U*b* the identifications (that is, the connection numbers in accordance with switching conditions) of call*ed* speaking stations. The identifications of the exchange office lines are stored in the circulation storage device U*u*, both for incoming and outgoing calls. The identifications of the calling sets of the exchange locations are stored in rotation storage device U*p*. Analogous provisions exist for the digit receivers, by which the storage device U*z* provides for control of the speaking switch SZ*x*.

As already described above, identifications assigned to one connection have the same pulse phase. Each decoder D*a*, D*b*, D*u*, D*p*, and D*z* have as many output connections as the number of speaking stations, etc. assigned to that decoder. Thus, to each of these outputs there is assigned either a speaking station or an exchange office line, or a calling set, etc. Each speaking switch of the series SN1, SN*x* is connected both to an output of the decoder D*a* and to an output of decoder D*b*. Appropriate isolating circuits such as logical OR devices, may be provided to prevent the decoders from interfering with each other's operation.

If the identification, such as a connection number, of a speaking station is provided to a decoder such as D*a*, a pulse is conveyed to exit A2. This pulse is assigned to this speaking station for the connection to be made, or for the connection which has already been made involving the corresponding station. The pulse is then utilized for the control of the speaking switch, for example SN1 assigned to this particular speaking station, for example N1. If two speaking switches, such as SN1 and SA*x* are connected simultaneously to the multiplex point SM, the corresponding speaking stations are coupled together by the mutliplex path. This condition is repeated periodically, such as every 100 microseconds, at the circulation period of the identifications circulating in the storage devices U*a* and U*b*.

Now let it be assumed that a party wishes to contact a speaking station N1 of the secondary telephone installation, over the exchange office line AL*x*. A calling pulse therefore exists at this exchange office line and a corresponding pulse is given to the control apparatus S*t*E to seize a free pulse phase. The signal generator UZ identifies the various exchange office lines and switches on, periodically, an identification of the exchange office line AL*x*, at its output A3. As indicated, such occurs for a time period of 100 microseconds during each cycle of the generator UZ. Each time that an identification of an exchange office line is switched on by the generator UZ, the switching condition of that line is checked. This is done by use of an inquiry pulse P0 emitted by the control apparatus S*t*E. Emission of this pulse causes a return over line *sc*1 to the control apparatus S*t*E identifying the "call" condition of the exchange office line AL*x*. In the control apparatus it is first ascertained whether a free pulse phase is available for the connection which is desired to be made. If a pulse phase is free, a connection can then be made, and this phase is assigned to the exchange office line AL*x* for the build up of the connection and during the duration of the call to be made.

After the assignment of the free pulse phase, for example, P1, the connection number of the exchange office line AL*x* is transmitted by operation of switch D3 from signal generator UZ to the circulation storage device U*u*. This operation results in the identification of exchange line AL*x* being stored in the storage device U*u* in phase P1 and since that storage device is of the repetitive type referred to above, it furnishes a pulse at phase P1 every 100 microseconds.

This pulse from storage device U*u* is provided periodically at phase P1 to the decoder D*u* by way of the output of the storage device U*u*. This impulse appearing in decoder D*u* at pulse phase P1 is then provided to the corresponding speaking switch SA*x* to operate that switch and connect the exchange office line AL*x* to the multiple point SM. However, the operation of the speaking switch SA*x* is only possible by periodic activation of the control switch S*p*3 associated with the decoder D*u*. This switch S*p*3 is controlled by control circulation storage device U*du*. (See our said copending application for a more complete description of these elements.)

Upon registration of the connection number of the exchange office line AL*x* in the circulation storage device U*u*, a free digit receiver Z*i* is seized, by way of the central control apparatus S*t*E. The identification of the free digit receiver seized by the exchange office line is then registered in the circulation storage device U*z* of the digit receiving arrangement in the same fashion as indicated for the registration of the identification of the calling exchange office line.

The seized digit receiver is switched to the speaking multiplex point SM over switch SZ*x* in the pulse phase P1, simultaneously with the switching of the exchange office line AL*x* to the same point. The digit receiver Z*i* therefore receives the identification digits transmitted by the calling station. These identification digits, normally sent coded, are preferably converted into binary direct current code signals by the digit receiving apparatus Z*i*. The identification of the desired speaking station by way of the direct current signal can be checked by an appropriate checking apparatus which is not shown. The digits are also, for example without temporary storage, and with pulse phase P1 switched to a circulation storage device U*b* identifying the called speaking station, under control of control apparatus S*t*E.

After the identification of the desired speaking station is registered in circulation storage device U*b*, an inquiry is made to the central control apparatus S*t*E as to whether the connection number of the dialed speaking station has already been registered in a circulation storage device U*a* or U*b*. Appropriate comparison devices not shown may be utilized for this purpose. These comparison devices can be used to prevent the completion of the connection to the called station in the event that the identification of such station is stored in either storage device U*a* or U*b*. indicating that the station is in an already-existing connection. In the event that the comparison apparatus indicates that the called station is not busy, the connections to the speaking multiplex point may be completed by operation of switches S*p*3 and S*p*2 which respecitvely control decoders D*u* and D*b*.

The switches S*p*1 to S*p*4 are each located between the output of the circulation storage device U- and the corresponding decoder D-. When these switches are not operated they prevent operation of the speaking switches by the corresponding storage devices and decoders. Each control switch, for example S*p*1, is closed by a pulse provided from the control storage device, for example U*da*, and permits the identifications appearing at the output of the corresponding circulation storage device, for example U*a*, to operate the corresponding decoder, for example D*a*. Each switch is only supplied with pulses to permit the connection through of the corresponding identifications when it is determined in the control apparatus S*t*E that the desired speaking station is still free. This determination of course is made by comparison of the identifications present in the storage devices. In this fashion, a number of different identifications circulating with different circulation phases can be transmitted to the appropriate decoders so that several simultaneous connections can be maintained, the maximum number being equal to the number of pulse phases provided. That is, the system provides for the time multiplex operation, but the use of switches, such as S*p*1 makes it possible to avoid the use of special temporary storage devices which otherwise would be necessary to provide for the storage of the identification numbers of, for example, the called speaking stations.

The operation of the control switches, for example, switch S*p*1 however is determined not only by the switching condition of the calling or called connection station, but also by other switching conditions. For example, if a speaking station initiates a reconfirmation by emission of a special identification or signal, at least one of the speaking stations participating in the original connection is to be cut off from the signal multiplex point. This is made possible in simple fashion because the corresponding switch, for example S*p*1, can be prevented from operation at the particular time involved. In other words, if the corresponding pulse phase in control circulation storage device U*da* is cancelled, the switch S*p*1 will not be operated during that pulse phase and the speaking station dependent for connection to the multiplex point upon the operation of the switch S*p*1 will not be connected thereto at the particular pulse phase.

In accordance with the arrangement here described, therefore, any one of the switches S*p*1 to S*p*4 can be prevented from operating at the appropriate time, so that any one of the calling speaking stations, the called speaking stations, the exchange office lines or the calling sets can be prevented from being switched to the multiplex point. The control of the impulses in the control stores such as U*da*, is dependent upon the control apparatus S*t*E. In other words, a registration pulse is transmitted from the control apparatus if the auxiliary storage device is to actuate the corresponding switch, for example S*p*1. If such is to occur, an impulse is provided at the output of the control store U*da* each time a pulse is to be provided to operate the corresponding switch, for example S*p*1.

Changes in the switching condition during a connection requested by signals given by a station participating in the existing connection are ascertained or identified at the time the signal generator switches on the address of the corresponding station emitting that signal. That is, if one of the secondary exchange stations emits such as a reconfirmation signal, that fact will be ascertained when the signal generator AZ emits the signal identifying the address of that station. Then, in accordance with the requested switching condition, corresponding control processes are initiated in the control apparatus S*t*E.

In dependence on the signal combination which is conveyed to the central control apparatus S*t*E appropriate lattice or logical AND and OR circuits, and flip-flop circuits may be controlled. These apparatus may then emit commands for either the emission of new information signals or for the control of appropriate switches.

With the apparatus of FIG. 2, reconfirmation connection can be initiated by one of the connected stations in an existing connection, for instance between speaking station N1 and exchange office transmission device AU*ex*. For this purpose pulse phase P1 is assumed to be employed. The identification of speaking station N1 is picked up, with phase P1 in the rotation storage device U*b*, since it is assumed that the speaking station N1 was the called station of the original connection. The identification of the exchange office transmission device AU*ex* is stored in circulation storage device U*u*, provided for exchange office lines. If, for example, the speaking station N1 operates a reconfirmation key to make a reconfirmation call during the existing connection, the loop connection of this speaking station N1 is changed. This key may be for example the eleventh digit key as is well known. The change in loop condition of the speaking station N1 may be ascertained when pulse phase P1 assigned to the existing connection arrives. A free digit receiver ZE*x* is then requested and the identification emitted by the station N1 is picked up in the digit receiving means Z*i*. A checking arrangement ZZ is provided and assigned to digit receiving means Z*i*, so that it may be ascertained that the signal received is a reconfirmation identification.

The checking arrangement ZZ, upon detection that station N1 has emitted a reconfirmation signal, emits a pulse to control apparatus S*t*E by way of line *zz*. The control apparatus then ascertains that pulses appear simultaneously in phase P1 in the circulation storage device U*u* and U*b*, at the time the reconfirmation pulse appears, so that it is ascertained that a calling condition exists. Simultaneously, by way of the signal multiplex line SMLB, by reason of the change in condition in the party circuit T1 as a result of the reconfirmation signal, an impulse is given to the control apparatus S*t*E. This signal identifies that speaking station N1 is the one initiating a reconfirmation connection. An evaluation of the different signals at the entrances to the control apparatus at this time may be made by appropriate lattice circuits, such as logical AND and OR circuits, as well as through flip flop circuits, and command pulses may then be formed in the control apparatus. Illustrative showings of such circuits are contained in copending application Ser. No. 390,143, filed in the names of Alan Darre, Otto Kneisel and Horst Honold, and assigned to the same assignee as the present application.

First a pulse of phase P1 is stored in the special circulation storage device RB in order to record that the speaking station identified in circulation storage device U*b* at that phase is the one emitting the identification to initiate reconfirmation. The pulse circulating with phase P1 in the special auxiliary storage devce RB is provided to the central control apparatus S*t*E by way of line *rb'*. This signal, together with the signals provided by way of lines *vb* and *vu* (identifying the call condition) are evaluated by the control apparatus and, in response, a pulse is provided by way of line *du'*, this pulse cancelling the pulse circulating in the control storage device U*du* with phase P1. As a result of this cancellation the switch S*p*3 is no longer operated during pulse phase P1 and thus the speaking switch SA*x* is no longer operated to switch the exchange office line AL*x* to the signal multiplex point SM during pulse phase P1.

Also the same pulse phase P1 is assigned to the party of speaking station N1 for the production of a new call connection, that is the reconfirmation connection, this assignment being effected by reason of the various signals provided to the central control apparatus identifying that the speaking station N1 is the one which requested the reconfirmation connection.

Assuming now that the party of speaking station N1 dials the party of speaking station N*x*, in the reconfirmation connection, the identification of the speaking station N*x* is then stored with phase P1 in the circulating storage device U*a*. The build up of the reconfirmation connection then takes place in the same fashion as the build up of the original connection. The speaking stations N1 and N*x* are then connected periodically to the speaking multiplex point SM by the pulse phase P1. The exchange office party however cannot listen in to the reconfirmation call because this party is not connected to the signal multiplex line during the pulse phase P1.

If now the party of the speaking station which was called during the reconfirmation call, for example N*x*, utilizes the eleventh digit key, an impulse is provided by the control apparatus for cancellation of the pulse at pulse phase N1 stored in control storage device U*db*. As a result, switch S*p*2 is no longer operated at pulse phase P1 so that the speaking station N1 is no longer switched to the speaking multiplex point during the phase P1. Simultaneously, the control apparatus stores a pulse with phase P1 in the control circulation storage device U*du*, to once more operate the switch S*p*3 at pulse phase P1. As a result of this operation the exchange office line AL*x* and the reconfirmed station N*x* are connected to the speaking multiplex point SM during each pulse phase P1.

It will be seen from the foregoing description that the shifting takes place by reason of cancellation of the pulse stored in the control storage device assigned to the reconfirming speaking station and the registration of the corresponding pulse with the call pulse phase in the control storage device assigned to the waiting speaking station which is not participating in the reconfirmation connection, for example the control storage apparatus for the control of switch S*p*3. With this technique, in shifting of an exchange office connection by reason of the identifications present, the call "counting" in the case of outgoing exchange office calls is reversed, according to the known technique, from the recalling speaking station to that to be recalled.

In the event that the party requesting the reconfirmation connection is the one which activates the eleventh key during the reconfirmation call, the original call is retraced in similar fashion. Each further reconfirmation takes place after the reconstruction or the shifting of the original connection. The number of reconfirmation calls that can be made is of course unlimited.

It will be evident that many minor changes could be made in the apparatus specifically described herein as illustrative of the invention. Accordingly, the invention is not to be considered limited to the apparatus specifically described but rather only by the scope of the appended claims.

We claim:

1. In a telephone exchange system operating in accordance with the time multiplex principle to transmit information over a multiplex path and including a first and a second circulation storage device respectively operable periodically to provide at their outputs coded identification of one of a plurality of stations of one type, depending upon whether such station is the calling or the called station in an existing connection, a third circulation storage device operable to periodically provide at its output a coded identification of a station of another type when that station is either the called or the calling station of said existing connection, a speaking switch connected between each station and the multiplex path and operable when closed to connect its station to that path, a different decoder connected to each of said storage devices with the first and second decoder each connected to each station of said one type and the third decoder connected to said station of the other type, said decoders each being operable to translate the coded identification provided from their respective storage devices into operation of the speaking switch assigned to the identified station, the identification of the calling and called stations of the existing connection being stored in the respective storage devices in the same cyclic pulse phase, at least one of said calling and called stations being operable to emit a special signal signifying a desired change in connection, the improvement comprising, a different control circulating storage device associated with each of said decoders, the two control devices associated with the two storage devices in which identifications of the calling and called stations of said existing connection are circulating being operable to provide at their outputs periodically during the connection a pulse of the said same pulse phase, said control devices each being operable to permit operation of the associated decoder only when such pulses are available at their outputs, and cancellation means responsive to emission of said special signal for one of said calling and called stations and operative to cancel the said pulse in the control device associated with the other station to prevent that other station from being connected to the multiplex path in the said pulse phase.

2. The apparatus of claim 1 including identification means for supplying a coded identification of the called station of the new connection requested by said special signal, switch means responsive to emission of said special signal for connecting said identification to the storage means not involved in the existing connection, and means for recording in the control device associated with said last-named storage means a pulse of said pulse phase, so that the calling and called stations of the new connection are periodically connected to the multiplex path in that pulse phase.

3. The apparatus of claim 2 including cancellation means operative upon emission of a further special signal by the calling station of said new connection to cancel the pulse of said same pulse phase in said last-named control device to prevent further connection of the called station of said new connection to said multiplex path in said same pulse phase, and means operative upon said emission of said further special signal to supply a pulse of said same pulse phase to the control device associated with said other station to allow the original connection to be re-established.

4. The apparatus of claim 2 including cancellation means operative upon emission of a further special signal by the called station of said new connection to cancel the pulse of said same pulse phase in the control device associated with the calling station of said new connection to prevent further connection of said calling station to said multiplex path in said same pulse phase, and means operative upon said emission of said further special signal to supply a pulse of said same pulse phase to the control device associated with said other station to allow a connection between said other station of the original connection and said called station of the new connection to be established.

References Cited

UNITED STATES PATENTS

| | | | |
|---|---|---|---|
| 2,766,327 | 10/1950 | Lesti | 179—15.9 |
| 2,984,705 | 5/1961 | Harris | 179—15 |
| 3,271,521 | 9/1966 | Von Sanden et al. | 179—15 |
| 3,296,377 | 1/1967 | Von Sanden et al. | 179—15 |

KATHLEEN H. CLAFFY, *Primary Examiner.*

L. A. WRIGHT, *Assistant Examiner.*